March 7, 1933.   P. HALBACH   1,900,282

MECHANICAL BRAKE FOR RAILWAY MOTOR CARS

Filed June 9, 1926   3 Sheets-Sheet 2

Inventor:
Paul Halbach,
By Henry Orth
atty

March 7, 1933. P. HALBACH 1,900,282
MECHANICAL BRAKE FOR RAILWAY MOTOR CARS
Filed June 9, 1926  3 Sheets-Sheet 3

Inventor:
Paul Halbach

Patented Mar. 7, 1933

1,900,282

UNITED STATES PATENT OFFICE

PAUL HALBACH, OF REMSCHEID, GERMANY, ASSIGNOR TO THE FIRM BERGISCHE STAHL-INDUSTRIE, OF DUSSELDORF-OBERKASSEL, GERMANY

MECHANICAL BRAKE FOR RAILWAY MOTOR CARS

Application filed June 9, 1926, Serial No. 114,751, and in Germany February 4, 1926.

This invention is an improvement in the invention claimed in specification Ser. No. 79,191.

The invention relates to a mechanical brake for motor-driven railway or like vehicles and consists more particularly in this, that in the space between the motor casing mounted on the wheel axle and the inner face of the wheel a brake is provided having brake blocks which act in the axial direction. Preferably the braking surface is formed by two discs at a certain distance apart on the opposing inner faces of which the brake blocks are caused to act by means of a toggle mechanism. One of the brake discs may be mounted on the wheel to be braked or in the case of disc wheels be formed by the inner face of the same.

The brake disc arranged on the wheel may consist in a ring for fastening of which abutment surfaces may be provided on the spokes of the wheel which are formed by the spokes recessed by turning.

On the side of the spokes of the wheel remote from the annular brake disc a second ring may be provided in recesses in the spokes the two rings being held against the spokes by being clamped together by screws. When two separate discs are used these may be suitably connected together by a sleeve mounted on the wheel axle so as to turn with the latter.

The bearing surface of the annular brake disc may be accommodated to the form of the spokes or in the case of disc wheels to one side of the disc the disc being fixed by means of screws which are passed through the spokes or the disc but do not extend right through the brake disc.

The brake blocks which act on one and the same disc are preferably connected by a yoke piece, the general direction of which is more or less parallel to the plane of the disc.

Figure 1:
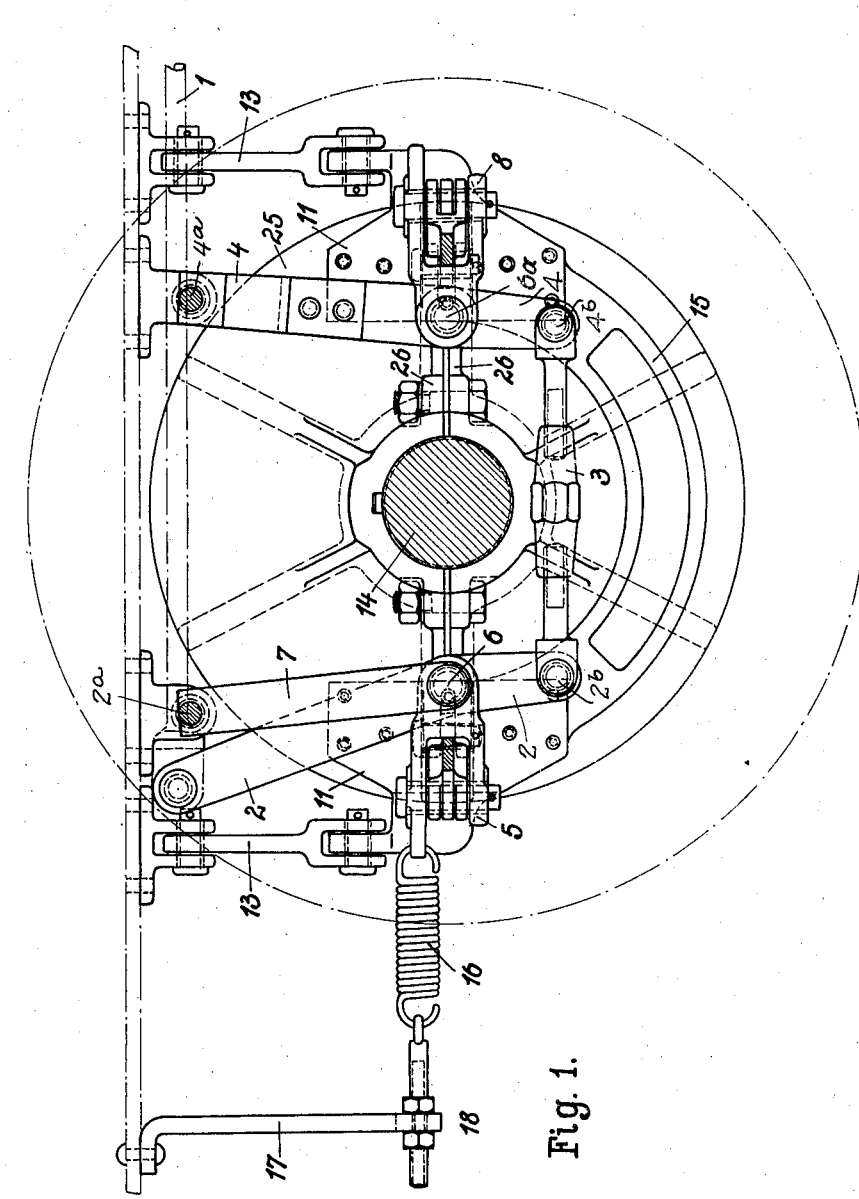

In the accompanying drawings, a constructional example of the invention is shown, Figure 1 being a side view of the brake looking from the middle of the axle towards the wheel.

Figure 2:
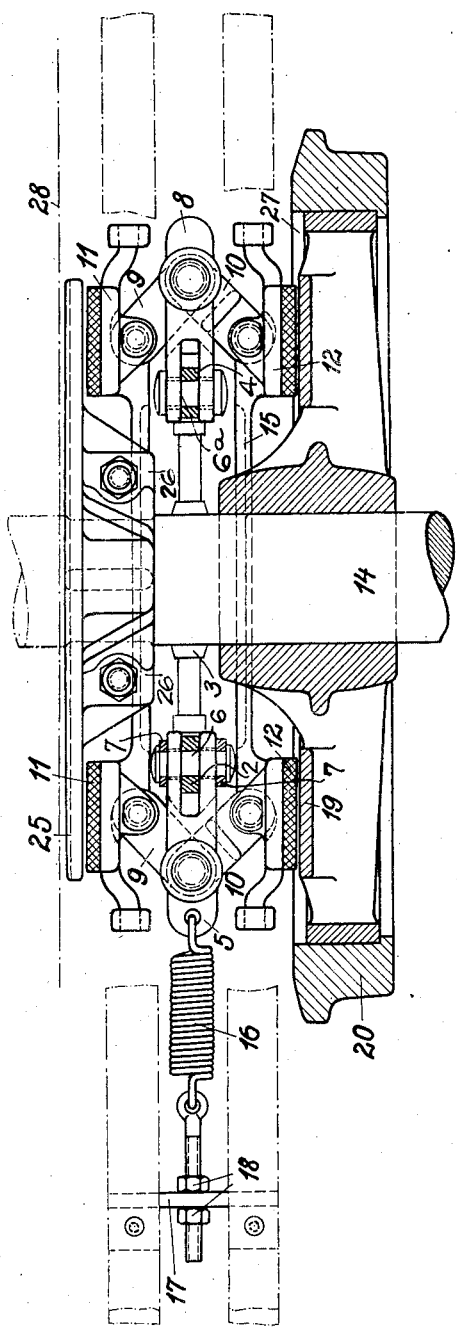
Figures 3, 4:
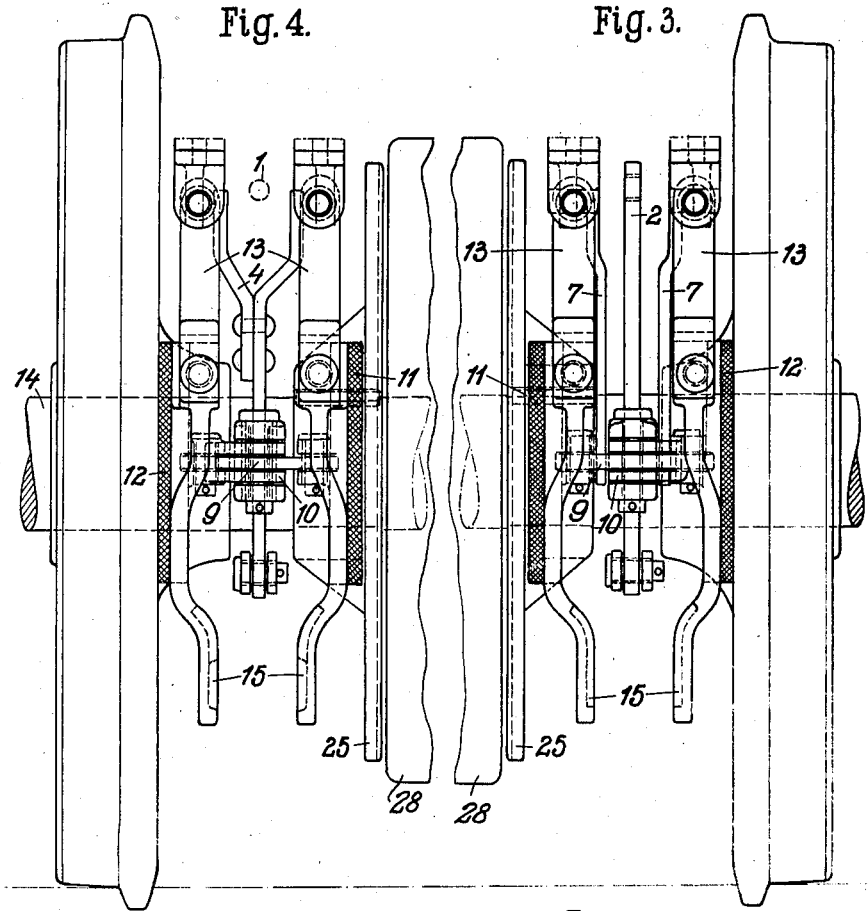

Figure 2 a plan view, Figure 3 a view from the left and

Figure 5:
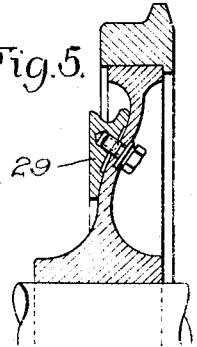

Figure 4 a view from the right of the brake shown in Figure 1,

Figure 5 shows one way of fixing the brake disc to the wheel, and

Figure 6:
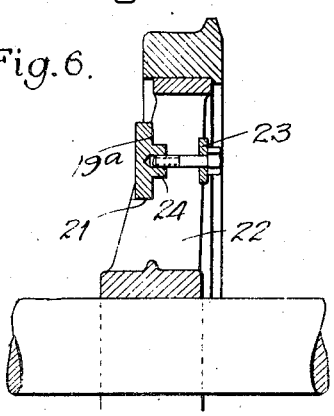

Figure 6 another method.

In the drawings 1 is the pull bar for the brake, which is pivotally attached to the lever 2 between the brakes, which lever is connected by an adjustable connecting member 3 to the lever 4 between the brakes, the upper forked end of the lever 4 being pivotally attached to the under-frame of the vehicle. 5 is a double forked part which embraces the lever 2 and is connected to it by a pin 6. On the pin 6 are also mounted links 7 the upper ends of which are pivoted to the under-frame of the vehicle at 2a. 8 is a part corresponding to the part 5 which is pivoted at 6a to the brake lever 4. Each of the parts 5 and 8 carries a link 9 and 10 respectively which are pivotally attached to the brake blocks 11 and 12. The brake blocks are supported on links 13, the upper ends of which are pivoted to the under-frame of the vehicle, and are capable of rocking in the direction of the axle 14 of the wheels. The brake blocks 12 lying on either side of the axle 14 are connected together by the arcuate member 15. The brake blocks 11 are similarly connected together. The brake blocks are provided with friction pads consisting of asbestos or the material known by the name "ferodo". To the left hand forked member 5 a helical spring 16 is attached the other end of which is fixed to the under-frame of the vehicle at 17. The tension of the spring can be regulated by means of the nuts 18. The brake blocks coact with brake discs of which the disc 19 coacting with the brake block 12 is in the form of an annulus and is fixed to the spokes of the wheel 20. For fixing the annular disc 19 a recess is turned in the spokes of the wheel, the annulus being fixed to the spokes by means of screws or the like.

Figure 5 shows one way of fixing the annular brake disc to the wheel by means of screws, but in this case no recess is turned in the wheel but the abutment surface of the ring is shaped to correspond to the shape of the wheel.

Figure 6 shows another way of fixing the annular brake disc by means of recesses in the spokes of the wheel. In this case a recess 21 is turned into the spokes 22 for the reception of the annular brake disc 19a. On the opposite side of the spokes another recess is provided for the reception of an annular disc 23. The brake disc 19a is fixed by means of screws which are screwed into suitable bosses 24 on the brake disc 19a lying between the spokes of the wheel, the annular disc 23 forming an abutment for the heads of the screws.

The brake disc 25 which coacts with the brake blocks 11 is made in two parts the separating line lying on a diameter of the disc. The two parts are provided with flanges 26 which are bolted together. The brake disc is keyed on the axle 14. It will be seen that the construction and arrangement of the brake is such that there is room for the entire brake in the very limited space between the inner surface 27 of the wheel and the outside of the motor casing 28. This space is usually not more than 250 mm. Should the distance between the inner surface of the wheel and the wall of the motor casing facing it be greater than that just mentioned, it is possible to connect the brake discs which coact with the brake blocks together in such a manner that a brake drum is formed on the axle 14, the two side walls of which are formed by the brake disc. Such a brake drum might be made in two parts similarly to the brake disc 25. The fixing flanges may lie either inside the drum or outside the drum, this depending on the amount of space available between the wheel and the motor casing. In another modification of the brake a brake disc is fixed on the axle 14 in the middle between the motor casing and the wheel, the brake blocks acting from the outside on the brake disc.

The brake operates in the following manner:

By moving the pull bar 1 of the brake to the right the upper end of the lever 2 is also moved to the right. The lever 2 is not journalled rotatably about a stationary point but is connected by a connection 3 with the lever 4 which is rotatably journalled on the frame at 4a. Upon movement of the bar 1 to the right the intermediate levers 2 and 4 are brought closer together. Since the fork member 5 is subject to the tension of the spring, but the fork member 8 is not, the fork member 8 is moved to the left through the movement of the lever 4, and the brake jaws 11, 12 which are connected with the fork member 8 are spread apart. As soon as the brake jaws are applied against the corresponding braking surfaces, further movement of the lever 4 to the left is substantially checked. By a further movement of the rod 1 to the right the lever 2 is swung about the pin 2b, the position of which is determined by the now stationary pin 4b. The fork member 5 is also moved to the right against the action of the spring 14. The brake jaws 11, 12 which are connected with the fork member 5 are likewise spread apart until they are applied against the brake discs. By further movement of the rod 1 to the right the braking is increased.

To release the brake rod 1 is moved toward the left and the spring 16 carries the brake jaws back to their non-braking position. The brake jaws connected with the fork members 5 are first released and then the brake jaws connected with fork member 8 are released. The brake blocks 11, 12 are as shown in crossed lines covered with ferodofibre, wood or the like yielding material, as more particularly shown and described in the pending application Ser. No. 79,191 while the brake surfaces on the rings 19, 29 and the plate 25 are polished.

I claim:—

1. In a railway-vehicle, a rotating axle, a wheel at the end of the axle, a brake disk having a braking surface arranged normal to said axle, a disk fixed on the wheel, braking surfaces on the wheel disk and on the other disk spaced apart and opposite to one another, said other brake disk being mounted on the said axle, so that the distance of the braking surfaces from one another is smaller than the diameter of said wheel, and a brake shoe device within the space between the said surfaces, said device comprising brake shoes each movable in a direction parallel to the said axle.

2. In a railway-vehicle, a rotating axle, a wheel at the end of the axle, a brake disc having a braking surface arranged normal to said axle, a disk fixed on the wheel, braking surfaces on the wheel disk and on the other disk, said surfaces being opposite each other, said other brake disk being mounted on the said axle, so that the distance of the braking surfaces from one another is smaller than the diameter of said wheel, a brake shoe device within the space between the said surfaces, said device comprising brake shoes each movable in a direction parallel to the said axle, a toggle joint between the brake shoes, and a lever to operate said toggle joint to reciprocate parallel to the said braking surfaces, said lever being arranged substantially in the middle of the space between said brake surfaces.

3. In a railway-vehicle, a rotating axle, a wheel at the end of the axle, a brake disk having a braking surface arranged normal to the axle, a disk fixed on the wheel, braking surfaces on the wheel disk and on the other disk, said surfaces being opposite to another, the said other brake disk being mounted on the said axle, so that the distance of the braking surfaces from one another is smaller than the diameter of said wheel, a brake shoe device within the space between the said surfaces and comprising a plurality of brake shoes, a toggle joint for moving the brake shoes to bring them into engagement with the said braking surfaces, and a double armed lever to actuate the toggle joint, the lever arm operating the toggle joint being shorter than the other lever arm.

4. In a railway-vehicle, a rotating axle, a wheel at each end of the axle, a disk-like member, opposite each wheel, a brake contact disk on each wheel, a braking surface on each contact disk and on each of said disk-like members, said disk-like members being radially mounted upon the said axle with the distance between the braking surfaces of a wheel contact disk and its corresponding disk-like member smaller than the diameter of said wheel, a brake shoe device arranged within the space between said wheel and said disk-like member, said device comprising brake shoes, means within the space between said wheel and said disc-like member for suspending the said device to the underframe of the vehicle and for permitting a swinging movement of the said brake shoes in a direction parallel to the said axle, and other means for actuating the said brake shoe device so as to bring the said brake shoes into engagement with the corresponding braking surfaces of said wheel and disk-like member.

5. In a railway-vehicle according to claim 1, a toggle joint for moving the brake shoes.

6. In a railway-vehicle according to claim 1, means for suspending each said brake shoe device to the underframe of the vehicle and for permitting a swinging movement of the brake shoes of each said brake shoe device in a direction parallel to the said axle.

7. In a railway-vehicle according to claim 1, means for spreading the brake shoes.

8. In a railway-vehicle, according to claim 1, a toggle joint between the brake shoes, and a lever adapted to operate the said toggle joint and to reciprocate in a plane radially to the said axle.

9. In a railway-vehicle, according to claim 2, a pull bar adapted to move the said lever so as to press the brake shoes against their disks.

10. In a railway-vehicle, according to claim 2, a spring connected to the toggle joint and adapted to bend inwards the toggle joint so as to bring the brake shoes into their positions of rest.

11. In a railway-vehicle, according to claim 1, a pull bar, a toggle joint between the brake shoes and means for spreading the toggle joint, the said means for spreading the toggle joint consisting of a double armed lever adapted to be operated by the said pull bar in a plane parallel to the said braking surfaces, and to operate the toggle joint, the longer than the lever arm operating the toggle joint.

12. In a railway-vehicle according to claim 1, one of the said disks consisting in a ring secured by bolts in turned out spaces at the inner side of the spokes of a said wheel.

13. In a railway-vehicle according to claim 3, the brake shoes acting on a brake disk being connected by a yokelike member.

14. In a railway-vehicle according to claim 1, one of the said disks consisting in a ring placed in turned out spaces at the inner side of the spokes of a said wheel, a second ring placed in spaces turned out on the outer side of the spokes of the said wheel, and bolts for clamping the said rings together.

15. In a railway-vehicle, according to claim 1, said braking device being arranged on both ends of said axle.

16. In a railway vehicle, a rotating axle, a wheel at the end of the axle, a first brake disk and a second brake disk being arranged on said axle, braking surfaces on said brake disks spaced apart and opposite to one another, said braking surfaces being arranged normal to said axle, said brake disks being mounted on said axle, so that the distance of the braking surfaces from one another is smaller than the diameter of said wheel, and a brake shoe device within the space between the said braking surfaces, said device comprising brake shoes each movable in a direction parallel to the said axle.

17. In a railway vehicle, a rotating axle, a wheel at each end of the axle, a motor casing being arranged within the space between said wheels, carrying means having braking surfaces spaced apart and opposite to one another, said carrying means being arranged within the space between said motor casing and one of said wheels, and a brake shoe device within the space between said surfaces, said brake shoe device comprising brake shoes each movable in a direction parallel to said axle.

In testimony whereof I affix my signature.

PAUL HALBACH.